April 30, 1929.  A. R. HAVENER  1,711,230

OIL CUP

Filed April 27, 1928

INVENTOR
Arthur R. Havener,
by Charles S. Gooding,
Atty.

Patented Apr. 30, 1929.

1,711,230

UNITED STATES PATENT OFFICE.

ARTHUR R. HAVENER, OF WAYLAND, MASSACHUSETTS, ASSIGNOR TO JUDSON L. THOMSON MANUFACTURING CO., OF WALTHAM, MASSACHUSETTS, A CORPORATION OF MASSACHUSETTS.

OIL CUP.

Application filed April 27, 1928. Serial No. 273,231.

This invention relates to an improved oil cup for movable members, such as, rotary shafts, rock shafts, pivotally mounted members, such as, levers, and the like.

The object of the invention is to provide a cheap, simple and efficient oil cup for the purposes hereinbefore set forth, and one which is particularly adapted to be used in connection with machinery where there is considerable dirt and dust deposited on the machine.

Another object of the invention is to prevent the oil, which may not have entered the hole leading to the movable member but has been deposited on the face of the member in which the movable member is supported, from entering said hole and carrying with it dirt and dust to the detriment of the bearing and the member movably mounted therein.

The invention consists in an oil cup such as hereinafter described in the specification and particularly as pointed out in the claims.

Referring to the drawings:—

Like numerals refer to like parts in the views of the drawings.

Figure 1:
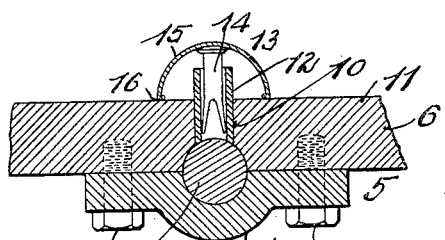
Figure 1 is a sectional elevation of a bearing and shaft with the oil cup of this invention attached thereto.

In the drawings, 5 is a bearing of well-known construction consisting of a body portion 6 and a cap 7 attached to the body portion by screws 8. Rotatably mounted within the bearing is a shaft 9 which constitutes a movable member. A hole 10 in the body portion 6 of the bearing extends from the outer face 11 of said body portion to the shaft 9, and positioned in said hole is a tube 12 which conducts the oil to the shaft 9. A plug 13 consists of a bifurcated shank 14 and a head 15, the head being hemispherical and hollow. The edge 16 of the head bears against the outer face 11 of the body member 6.

Figure 2:
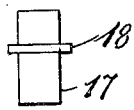
Fig. 2 is a front elevation of a modified form of oil cup tube.

In Fig. 2 a modified form 17 of the tube 12 is shown, which has an annular flange 18 thereon, the said flange forming a stop to limit the distance to which the tube 17 can be inserted in the hole 10 by reason of the flange 18 abutting against the outer face 11 of the body portion 6 of the bearing.

The oil cup hereinbefore specifically described is operated by removing the plug from the tube 12, then pouring oil into the tube 12 and replacing the plug. It will be seen that any excessive oil which is introduced into the tube 12 or which may fall from the oil can on to the outer face 11 of the body member 6 cannot flow into the tube, which would result in carrying with it dust, grit, and other impurities. Moreover, the edge 16 of the head 15, contacting with said outer face, prevents dirt from getting into the oil cup and into the bearing.

I claim:

1. An oil cup for a movable member having, in combination, a tube leading to said member and adapted to project beyond an outer face of the part in which said member is supported, and a plug comprising, a shank projecting into said tube and a hemispherical hollow head contacting with said outer face.

2. An oil cup for a movable member having, in combination, a shaft, a bearing in which said shaft is rotatably mounted, said bearing having a flat outer face and a hole leading from said outer face to said shaft, a tube positioned in said hole and projecting beyond an outer face of said bearing, and a plug comprising, a shank projecting into said tube and a hemispherical hollow head contacting with said outer face.

In testimony whereof I have hereunto set my hand in presence of two subscribing witnesses.

ARTHUR R. HAVENER.